US012770749B2

(12) United States Patent
Carver et al.

(10) Patent No.: US 12,770,749 B2
(45) Date of Patent: Oct. 20, 2026

(54) SIMPLIFIED ECONOMIC VENTILATED METAL STORAGE SYSTEM (SEVMSS)

(71) Applicant: NAC International Inc., Norcross, GA (US)

(72) Inventors: George Carver, Peachtree Corners, GA (US); Jay Wellwood, Peachtree Corners, GA (US); Daniel Hays Hogan, Cumming, GA (US)

(73) Assignee: NAC INTERNATIONAL INC., Peachtree Corners, GA (US)

( * ) Notice: Subject to any disclaimer, the term of this patent is extended or adjusted under 35 U.S.C. 154(b) by 161 days.

(21) Appl. No.: 18/953,191

(22) Filed: Nov. 20, 2024

(65) Prior Publication Data

US 2025/0357015 A1 Nov. 20, 2025

Related U.S. Application Data

(60) Provisional application No. 63/647,737, filed on May 15, 2024.

(51) Int. Cl.

*G21C 19/32* (2006.01)
*G21F 5/14* (2006.01)
*G21F 5/12* (2006.01)

(52) U.S. Cl.

CPC ............... *G21C 19/32* (2013.01); *G21F 5/14* (2013.01); *G21F 5/12* (2013.01)

(58) Field of Classification Search

CPC ................................ G21C 19/07; G21C 19/32
See application file for complete search history.

(56) References Cited

U.S. PATENT DOCUMENTS

| | | | | |
|---|---|---|---|---|
| 3,917,953 | A * | 11/1975 | Wodrich | G21F 5/14 976/DIG. 352 |
| 4,069,923 | A | 1/1978 | Blumenau | |
| 9,793,021 | B2 | 10/2017 | Carver | |
| 10,032,533 | B2 | 7/2018 | Carver | |
| 11,676,736 | B2 | 6/2023 | Pfeifer | |
| 2011/0091003 | A1* | 4/2011 | Bontemps | G21C 19/32 376/272 |
| 2021/0210238 | A1* | 7/2021 | Singh | G21F 5/008 |

FOREIGN PATENT DOCUMENTS

DE 19830908 A1 * 12/1999 ............... G21F 5/06

OTHER PUBLICATIONS

Extended European Seach Report in related EP Application No. 251758850.0, mailed Oct. 2, 2025.

* cited by examiner

*Primary Examiner* — Sharon M Davis
(74) *Attorney, Agent, or Firm* — Thomas | Horstemeyer, LLP

(57) ABSTRACT

Disclosed are various embodiments of a simplified economic ventilated metal storage system (SEVMSS) for enabling hazardous radioactive spent nuclear fuel in a contaminated pool to be loaded and stored in a metal canister and then placed within a passively ventilated metal overpack on a dry storage pad, without use of a transfer cask. The embodiments use an insert ring and a basin cup at respectively the top and bottom of the overpack to seal the annulus space of the overpack while the overpack resides in the pool. After cooling of the overpack and removal from the pool, the insert ring is replaced with a vented lid and the basin cup is removed. The overpack with canister is then placed on the dry storage pad with a seismic stability ring attached to its bottom or is placed in a recessed opening of a ventilated storage pad.

29 Claims, 8 Drawing Sheets

SIMPLIFIED ECONOMIC VENTILATED METAL STORAGE SYSTEM (SEVMSS)

CROSS-REFERENCE TO RELATED APPLICATIONS

This application claims the benefit of and priority to U.S. Provisional Patent Application No. 63/647,737, filed on May 15, 2024, the content of which is incorporated by reference herein in its entirety.

FIELD OF THE INVENTION

The embodiments of the present disclosure generally relate to loading hazardous radioactive spent nuclear fuel from a contaminated pool into canisters and placing the canisters into ventilated overpacks on a dry storage pad, without use of a transfer cask.

BACKGROUND

At commercial nuclear power plants, spent nuclear fuel has typically been stored in deep reservoirs of water, often called spent fuel pools, within the nuclear power plant. When these spent fuel pools reach their spent fuel capacity limits, or when the nuclear power plant undergoes a complete removal of spent fuel from the spent fuel pool at the end of the life of the facility, the fuel is transferred into metal canisters having final closure lids that are welded or otherwise closed and sealed at the power plants following the spent fuel or radioactive waste loading.

An example of a design for the canister is illustrated and described in U.S. Pat. No. 8,630,384, which is incorporated herein by reference. This design includes a basket having a number of internal parallel elongated rectangular tubes that receive the spent nuclear fuel.

A transfer cask, which is a separate container, is typically used to transport the canisters out of the contaminated pool. Examples of transfer casks are illustrated and described in commonly assigned U.S. Pat. Nos. 11,728,058 and 10,032,533, which are incorporated herein by reference. The transfer cask is typically costly and involves substantial time and human resources to operate the transfer cask to ensure safe transfer of the fuel.

The sealed canisters are removed from the transfer cask and placed into a ventilated storage overpack (typically consisting of layers of steel and concrete), which serves as an enclosure that provides mechanical protection, passive heat removal features, and additional radiation shielding for the inner metal canister that contains the radioactive material. Commonly assigned U.S. Pat. No. 11,676,736, which is incorporated herein by reference, illustrates and describes an example of a ventilated storage overpack that is made entirely of steel. The ventilated storage overpack, containing the welded metal canister within which the radioactive materials are stored, is then placed in the designated secure location outside of the nuclear power plant structure yet on owner controlled property so as to ensure proper controls and monitoring are performed in connection with the ventilated storage overpack containing the metal canister.

SUMMARY OF INVENTION

Disclosed are various embodiments of a simplified economic ventilated metal storage system (SEVMSS) for enabling hazardous radioactive spent nuclear fuel in a contaminated pool to be loaded and stored in a metal canister and then placed within a passively ventilated metal overpack on a dry storage pad, without use of a transfer cask, thereby saving substantial time, costs, and human resources. The embodiments use a metal insert ring and a metal basin cup at respectively the top and bottom of the overpack to seal the annulus space of the overpack while the overpack resides in the pool. After the overpack is removed from the pool, the insert ring is replaced with a vented lid and the basin cup is removed. The overpack with canister is then placed on the dry storage pad with a seismic stability ring attached to its bottom or is placed in a recessed opening of a ventilated storage pad.

One embodiment, among others, is a method. The method can be broadly summarized by the following steps: providing a metal overpack having an elongated cylindrical body extending between a top end and a bottom end, the body defining an internal annulus space, the bottom end having at least one inlet vent for enabling airflow into the annulus space; providing a metal canister having an elongated cylindrical body extending between a top end and a bottom end, the body defining an internal space designed to receive hazardous radioactive spent nuclear fuel; placing the canister into the overpack annulus space; attaching a basin cup at the bottom end of the overpack in order to seal the at least one inlet vent and the bottom of the overpack annulus space; installing an insert ring between the top end of the overpack and the top end of the canister in order to seal the top end of the overpack annulus space; placing the overpack into a pool that is contaminated with the hazardous radioactive spent nuclear fuel; loading the fuel into the canister; attaching a closure lid over the canister in order to seal the fuel within the canister; removing the overpack from the pool; removing the insert ring; installing a ventilated lid that has at least one outlet vent for enabling airflow out of the annulus space; and removing the overpack from the basin cup in order to provide a passively ventilated overpack with the canister for dry storage.

Another embodiment, among others, is a fuel loading apparatus that enables the canister to be loaded with hazardous radioactive spent nuclear fuel while the canister and overpack combination reside in the pool. The apparatus includes a metal overpack having an elongated cylindrical body extending between a top end and a bottom end. The body defines an internal annulus space. The bottom end has at least one inlet vent for enabling airflow into the annulus space.

The apparatus further includes a metal canister having an elongated cylindrical body extending between a top end and a closed bottom end. The canister resides within the overpack annulus space. The canister body defines an internal space containing hazardous radioactive spent nuclear fuel.

A closure lid is situated over the top end of the canister in order to seal the fuel within the canister.

A removable basin cup is attached at the bottom end of the overpack. The basin cup seals the at least one inlet vent and the bottom of the overpack annulus space.

A removable insert ring is situated between the overpack and the canister at the top end of each. The insert ring seals the top end of the overpack annulus space.

Other embodiments, apparatus, systems, methods, features, and advantages of the present invention will be apparent to one with skill in the art upon examination of the following drawings and detailed description. It is intended that all such additional embodiments, apparatus, methods, features, and advantages be included within this disclosure, be within the scope of the present invention, and be protected by the accompanying claims.

BRIEF DESCRIPTION OF THE DRAWINGS

Many aspects of the disclosure can be better understood with reference to the accompanying drawings. The components in the drawings are not necessarily to scale, emphasis instead being placed upon clearly illustrating the principles of the present disclosure.

DETAILED DESCRIPTION OF PREFERRED EMBODIMENT(S)

Disclosed are various embodiments of a simplified economic ventilated metal storage system (SEVMSS) for enabling hazardous radioactive spent nuclear fuel in a contaminated pool to be loaded and stored in a metal canister and then placed within a passively ventilated metal overpack on a dry storage pad, without use of a transfer cask, thereby saving substantial time, costs, and human resources.

Figure 1A:
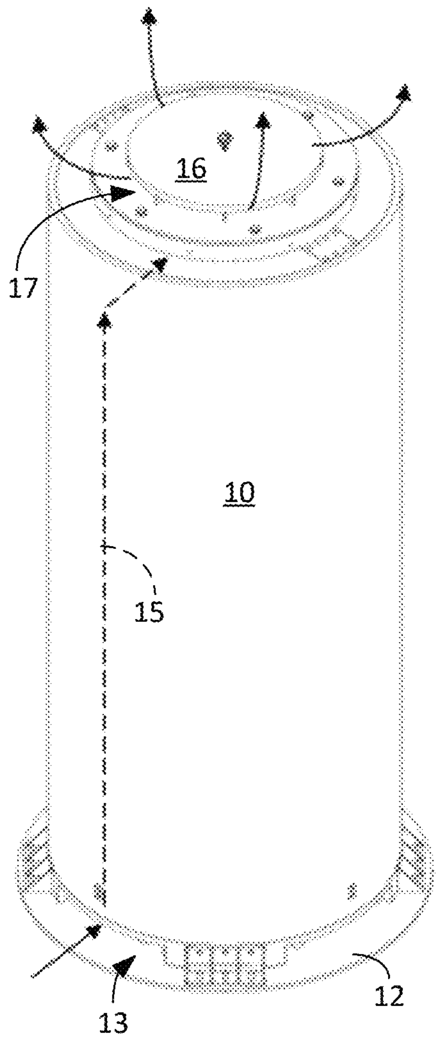
FIGS. 1A and 1B show a first embodiment of a passively ventilated metal overpack that contains a metal canister having hazardous radioactive spent nuclear fuel and that is designed with a seismic stability ring so that the overpack can be placed on a flat dry storage pad.
Figure 1B:
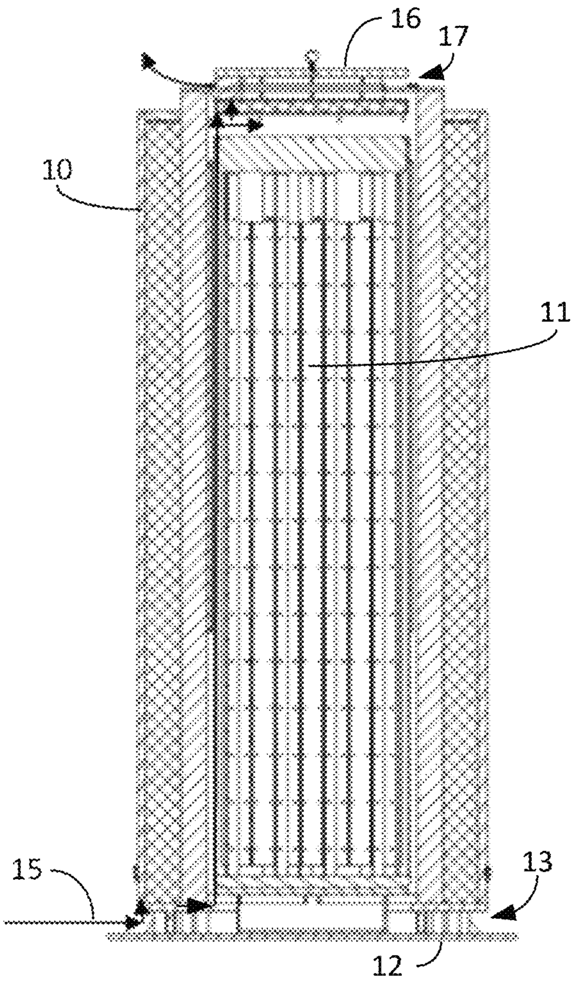
Figure 2:
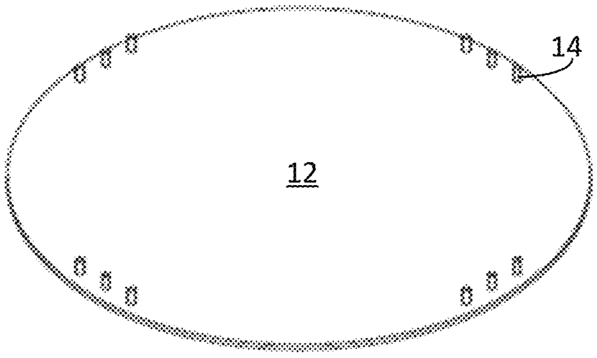
FIG. 2 shows a seismic stabilizing ring that is attachable to the bottom of the overpack of FIG. 1.
Figure 4:
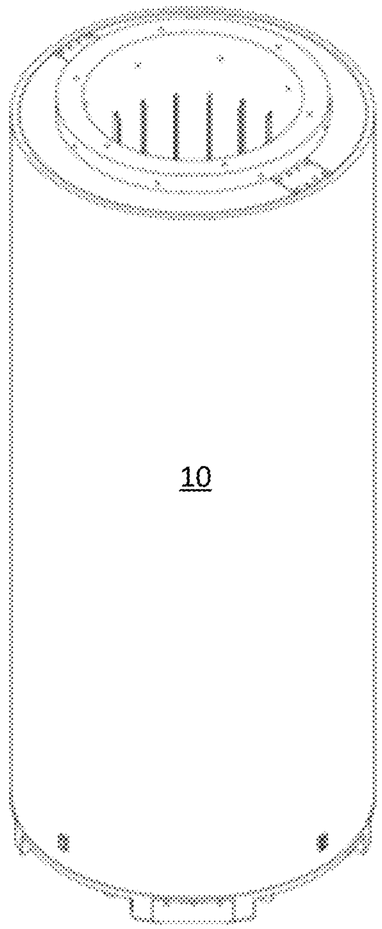
FIG. 4 shows the overpack of FIGS. 1 and 2 without the canister and ventilated lid.
Figure 5:
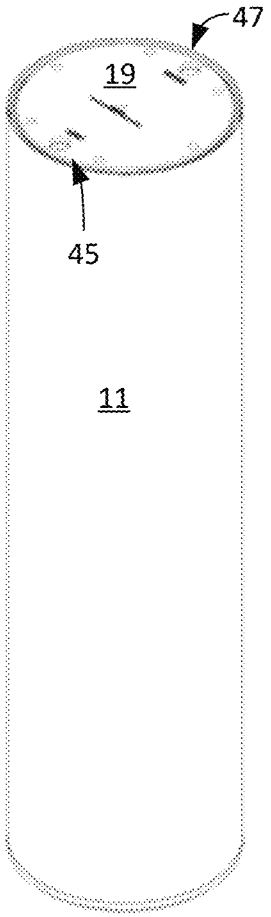
FIG. 5 shows the canister of FIG. 1.

More specifically, FIG. 1 shows a first embodiment of an SEVMSS, which has an overpack 10 (FIG. 4) that contains a variable capacity metal canister 11 (FIG. 5) having hazardous radioactive spent nuclear fuel and which is designed with a seismic stabilizing ring 12 shown in FIG. 2 so that the overpack 10 can be placed on a flat dry storage pad (not shown). The variable capacity canister 11 may vary in diameter and height to accommodate the nuclear materials specific to the nuclear reactor facility. Also, the dimensions of the overpack 10 can be adjusted based upon the dimensions of the canister 11.

The seismic stabilizing ring 12 having a plurality of upstanding threaded studs 14 enables attachment of the ring 12 to the bottom of the overpack 10. A removable ventilated lid 16 is secured at the top of the overpack 10. The arrows in FIGS. 1 and 2 show passive cooling via air flow into air inlets 13 at the bottom, through the annulus space 15 of the overpack 10, and then out of air outlets 17 at the top of the overpack 10.

Figure 3:
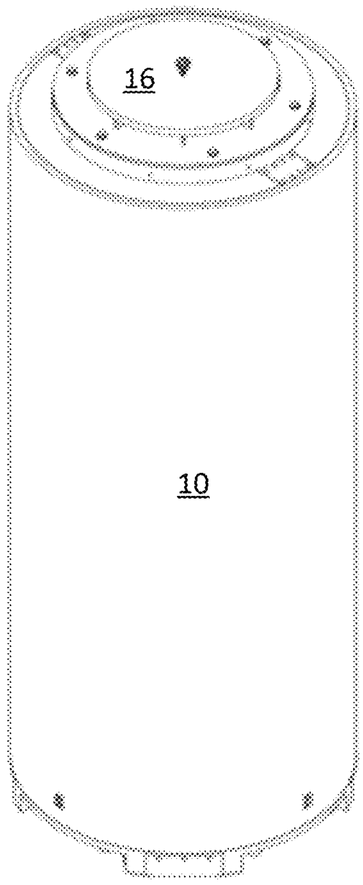
FIG. 3 shows a second embodiment a passively ventilated metal overpack that contains a metal canister having hazardous radioactive spent nuclear fuel and that is designed for placement in a recessed opening of a ventilated dry storage pad.

FIG. 3 shows a second embodiment an SEVMSS, which has the overpack 10 that can contain the metal canister 11 having hazardous radioactive spent nuclear fuel and that is designed (without the stabilizing ring 12) for placement in a recessed opening of a ventilated dry storage pad. An example of the ventilated dry storage pad that can be used is described in commonly assigned U.S. application Ser. No. 18/429,907, filed Feb. 1, 2024, which is incorporated herein by reference. The dry storage pad described in U.S. application Ser. No. 18/429,907 has a triangular storage array for increased densification of nuclear materials to be stored in a maximum space efficient configuration, which is useful in situations where there is limited space available for storage.

In the preferred embodiments, the lateral wall of the overpack 10 has at least three layers: a first inner layer of forged steel, a second steel layer that serves as a neutron shield, and a third outer layer of rolled steel that serves to absorb gamma radiation. An example of such a lateral wall configuration and a suitable canister 11 that can be employed is described in commonly assigned U.S. Pat. No. 11,676,736, which is incorporated herein by reference.

Figure 6:
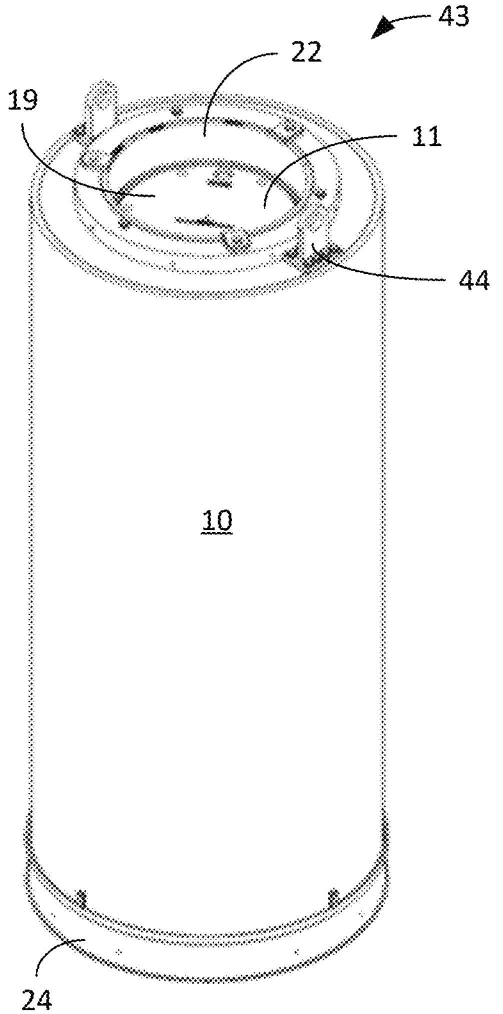
FIG. 6 shows an in-pool configuration of the overpack with an installed basin cup and an installed insert ring, both of which seal and isolate an elongated annulus region between the overpack and the canister from contaminated pool water.

As illustrated in FIGS. 6, the preferred embodiments use an insert ring 22 and a basin cup 24, preferably steel, at respectively the top and bottom of the overpack 10 to seal the annulus space of the overpack 10, while the overpack 10 resides in the pool, i.e., to isolate the annulus space 15 from the contaminated pool water. In essence, FIG. 6 shows the immersion and processing configuration, or the in-pool apparatus 43.

Moreover, as more specifically shown in FIGS. 8A through 8D, the basin cup 24 has a flat bottom 36 having a circular periphery and an upstanding cylindrical lateral wall 38. The basin cup 24 also has at least one inflatable seal 42 situated on the inside of the lateral wall 38. The basin cup 24 is attached to the overpack 10 via a plurality of upwardly extending tabs 37, each having an aperture through which fasteners, such as bolts, are passed. The foregoing seal 42 assists with preventing contaminants from entering the overpack annulus.

As more specifically shown in FIGS. 9A through 9D, the insert ring 22 has a body 25 in the shape of a circular band, or upstanding cylindrical lateral wall, with a plurality of outwardly and radially extending tabs 26, each with an aperture 28, as shown. Suitable fasteners, such as bolts, are passed through the apertures 28. The insert ring 22 also has a plurality of inflatable seals 32, 34, preferably, at least one circular seal 32 on the inside and at least one circular seal 34 on the outside. The tabs 26 enable the insert ring 22 to be moved by suitable tools and ensure positive restraint of the overpack 10. The foregoing seals 32, 34 assist with preventing contaminants from entering the overpack annulus.

Figure 7:
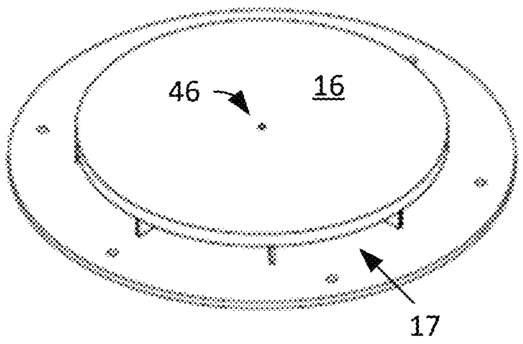
FIG. 7 shows the ventilated lid of FIGS. 1 and 2.
Figure 8D:
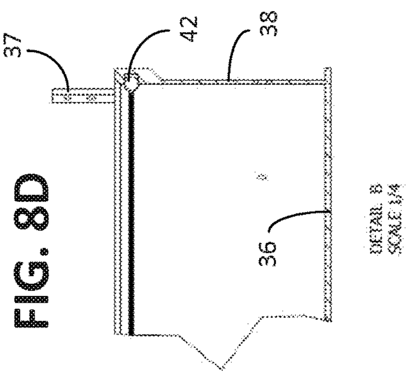
FIGS. 8A through 8D show the basin cup and the interior seal associated with the basin cup.
Figure 9D:
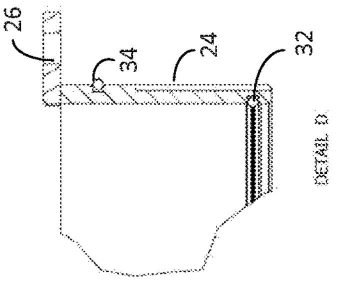
FIGS. 9A through 9D show the insert ring and the interior and exterior seals associated with the insert ring.
Figure 8B:
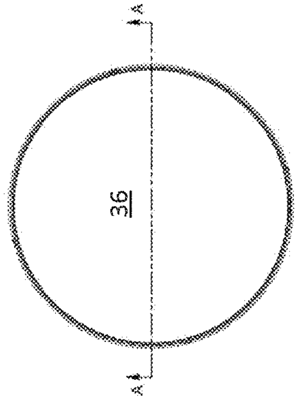
Figure 8C:
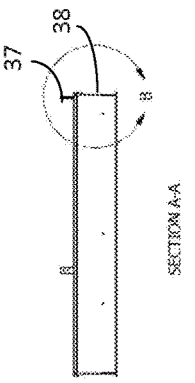
Figure 9B:
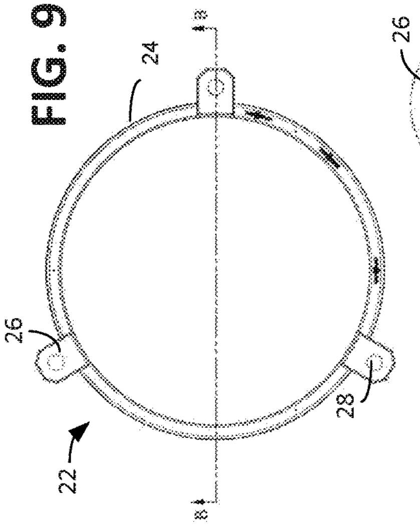
Figure 9C:
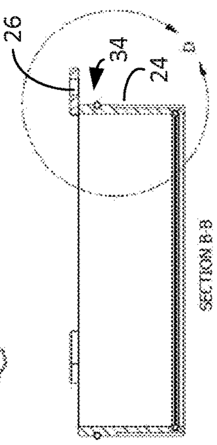
Figure 8A:
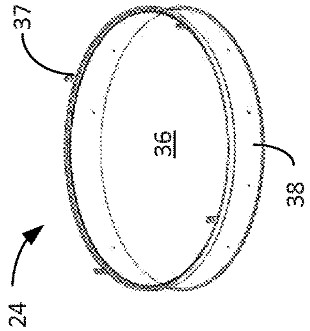
Figure 9A:
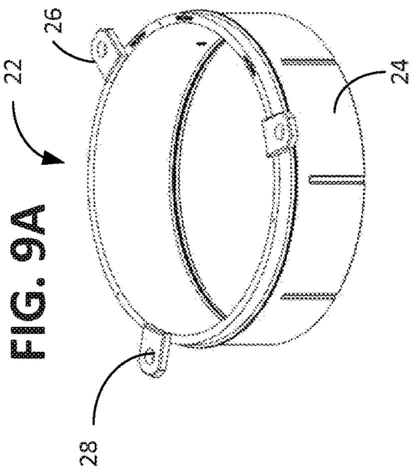

After the overpack 10 is removed from the pool, the insert ring 22 is removed and the ventilated lid 16 shown in FIG. 7 is installed on the overpack top and the basin cup 24 is removed. In the preferred embodiment, the ventilated lid 16 includes a centrally located, singular instrument, mounting location 46 for thermal performance monitoring. The overpack 10 with canister is then placed on the dry storage pad with a seismic stability ring 12 attached to its bottom or is placed in a recessed opening of a ventilated storage pad. As previously discussed, an example of a suitable ventilated dry storage pad is described in U.S. patent application Ser. No. 18/429,907, filed Feb. 1, 2024, which is incorporated herein by reference.

Figure 10:
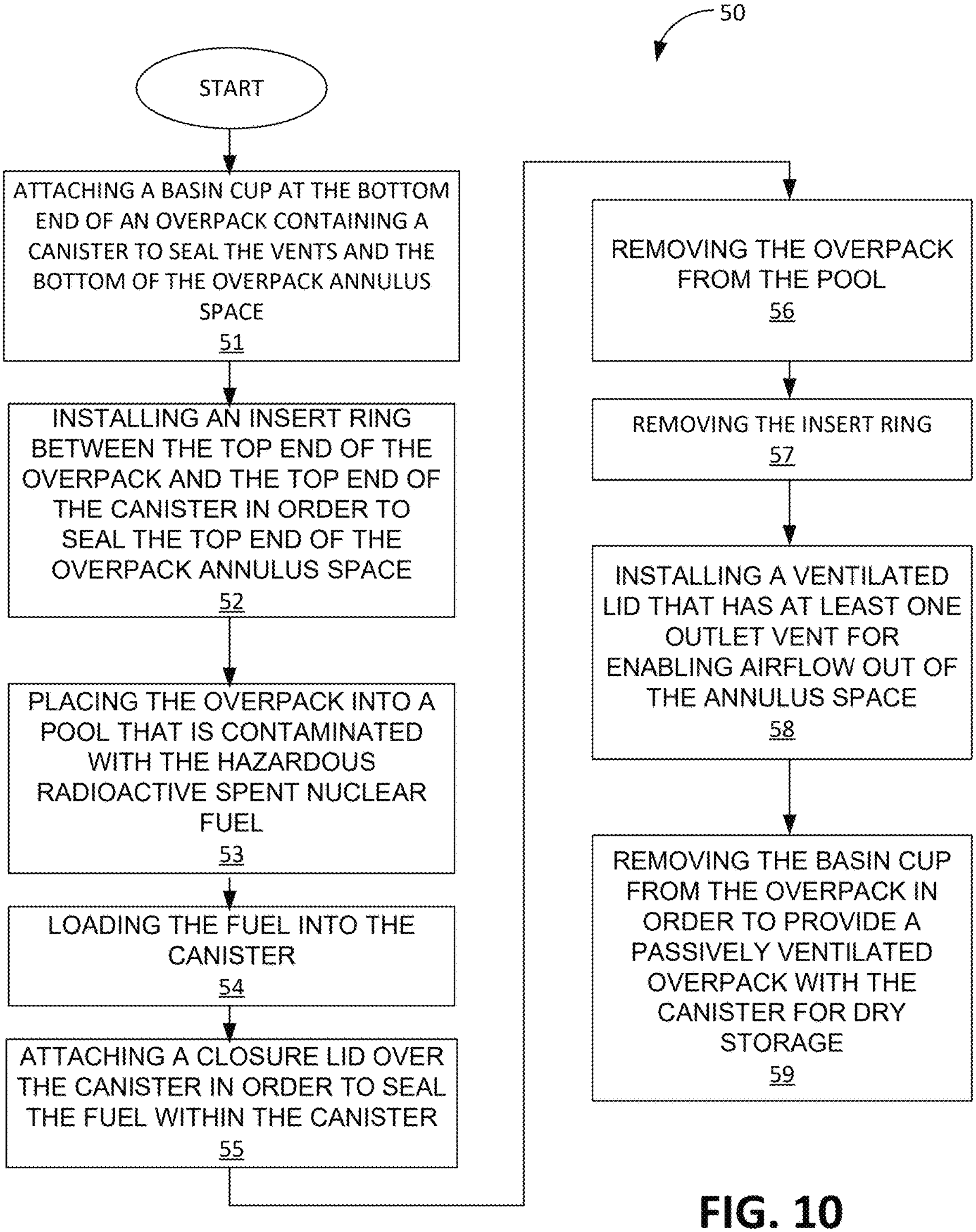
FIG. 10 is an embodiment of a method in accordance with the present disclosure.

As illustrated in FIG. 10, the present disclosure provides an embodiment of a method 50, among others, as follows.

A metal overpack 10 is provided that has an elongated cylindrical body extending between a top end and a bottom end. The body defines an elongated cylindrical internal annulus space 15. The bottom end has at least one inlet vent 13 for enabling airflow into the annulus space 15.

A metal canister 11 is provided that has an elongated cylindrical body extending between a top end and a bottom end. At this point, the canister 11 has a closed bottom end but is open at the top end. The body defines an internal space designed to receive hazardous radioactive spent nuclear fuel.

The canister 11 is placed into the overpack annulus space 15 associated with the overpack 10.

At indicated at block 51, the basin cup 24 is attached at the bottom end of the overpack 10 in order to seal the at least one inlet vent 13 and the bottom of the overpack annulus space 15.

As indicated at block 52, an insert ring 22 is installed between the top end of the overpack 10 and the top end of the canister 11 in order to seal the top end of the overpack annulus space 15, while leaving the canister 11 open at the top.

The overpack 10 is placed into a pool, as set forth in block 53. The pool is contaminated with the hazardous radioactive spent nuclear fuel. Preferably, the overpack 10 has a plurality of lifting trunions 44 to enable a crane to lift, move, and lower the overpack 10, as needed.

The spent fuel is loaded into the open canister 11, as indicated at block 54.

In accordance with block 55, a circular, generally flat, metal, closure lid 19 is attached over the canister 11 in order to seal the fuel within the canister 11. The circular metal closure lid 19 is attached to the canister 11 in the pool. More specifically, the closure lid 19 is lowered into place after the satisfactory verification of the canister contents (fuel and non-fuel hardware serial numbers). The closure lid 19 is installed either by slings and associated rigging hardware or may be suspended from a lifting yoke.

Next, as indicated at block 56, the overpack 10 is removed from the pool.

After removing the overpack 10 from the pool and prior to removing the insert ring 22, the closure lid 19 is welded on the canister 11 in order to seal it. Water is drained from the canister 11, and the canister 11 is filled with an inert gas, for example, helium gas. The canister lid contains two openings 45, 47: one serving as a vent and the other containing a threaded drain tube to facilitate draining, drying, and inert gas backfilling activities. These ports 45, 47 are then sealed using welded covers after completion of the inert gas backfilling activity.

As indicated at block 57, the insert ring 22 is then removed.

The ventilated lid 16 is installed on the top end of the overpack 10 that has at least one outlet vent 17, but preferably four, for enabling airflow out of the annulus space 15, as indicated at block 58.

Finally, at block 59, the overpack 10 is removed from the basin cup 24 in order to provide a passively ventilated overpack 10 with the canister 11 ready for dry storage.

In one embodiment, after removal of the basin cup 24, a seismic stability ring 12 (FIG. 2) can be attached at the bottom end of the overpack 10 and then the ventilated overpack 10 can be placed and secured with the seismic stability ring 12 on a storage pad. In another embodiment, after removal of the basin cup 24, the ventilated overpack 10 is placed on a recessed opening of a ventilated storage pad.

The aforementioned method is made possible by the in-pool apparatus 43 of FIG. 6, having the overpack 10 containing the canister 11, the basin cup 24, and the insert ring 22.

Figure 11:
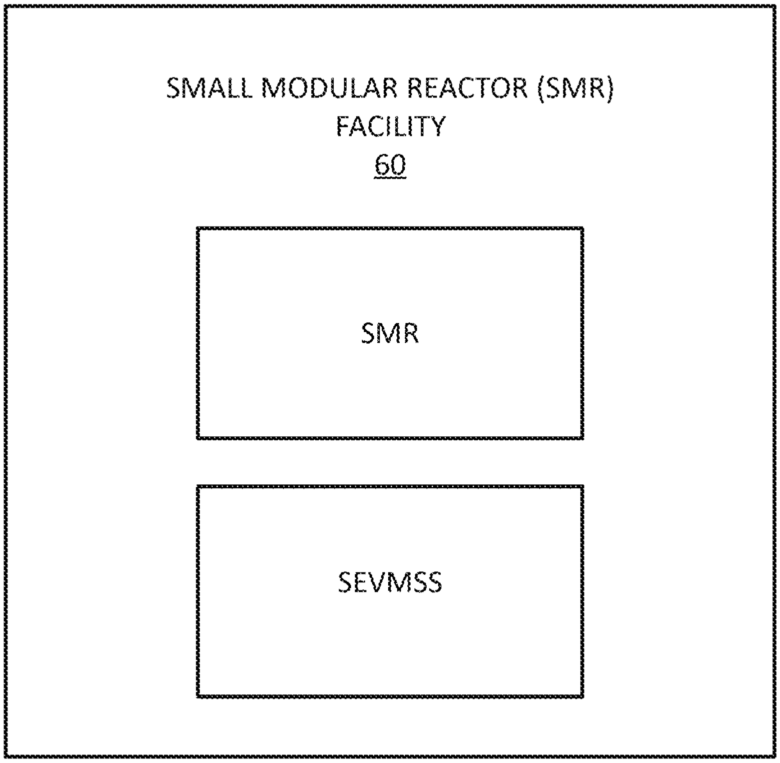
FIG. 11 shows the SEVMSS implemented in a facility having a nuclear reactor, for example but not limited to, a small modular reactor (SMR).

Furthermore, because of the small size of the overpack 10, the SEVMSS and the foregoing method can be performed in a facility 60 having a small modular reactor (SMR), as shown in FIG. 11.

Finally, it should be emphasized that the above-described embodiments of the present invention are merely a possible nonlimiting example of implementations, merely set forth for a clear understanding of the principles of the invention. Many variations and modifications may be made to the above-described embodiments without departing substantially from the spirit and principles of the invention. All such modifications and variations are intended to be included herein within the scope of this disclosure and the present invention.

The invention claimed is:

1. A method for enabling removal of hazardous radioactive spent nuclear fuel in a pool and then dry storage in canisters within ventilated overpacks, the method comprising the steps of:

providing a metal overpack having an elongated cylindrical body extending between a top end and a bottom end, the body defining an internal annulus space, the bottom end having at least one inlet vent for enabling airflow into the annulus space;

providing a metal canister having an elongated cylindrical body extending between a top end and a bottom end, the body defining an internal space designed to receive hazardous radioactive spent nuclear fuel;

placing the canister into the overpack annulus space;

attaching a basin cup at the bottom end of the overpack in order to seal the at least one inlet vent and the bottom of the overpack annulus space;

installing an insert ring between the top end of the overpack and the top end of the canister in order to seal the top end of the overpack annulus space;

placing the overpack into a pool that is contaminated with the hazardous radioactive spent nuclear fuel;

loading the fuel into the canister;

attaching a closure lid over the canister in order to seal the fuel within the canister;

removing the overpack from the pool;

removing the insert ring;

installing a ventilated lid that has at least one outlet vent for enabling airflow out of the annulus space; and removing the overpack from the basin cup in order to provide a passively ventilated overpack with the canister for dry storage.

2. The method of claim 1, wherein the basin cup has an inflatable inner circular seal and further comprising the step of inflating the basin cup seal in order to seal the at least one inlet vent and the bottom of the overpack annulus space.

3. The method of claim 1, wherein the insert ring has inflatable inner and outer circular seals and further comprising the step of inflating the insert ring seals in order to seal the top end of the overpack annulus space.

4. The method of claim 1, further comprising the step of introducing demineralized water into the overpack annulus space prior to placing the overpack into the pool.

5. The method of claim 1, further comprising the steps of, after removing the overpack from the pool and prior to removing the insert ring:

welding the closure lid of the canister in order to seal it;

via ports in the lid, draining water from the canister, and filling the canister with an inert helium gas; and
welding covers over the ports.

6. The method of claim 1, further comprising the steps of, after removing the overpack from the pool and prior to removing the insert ring:
deflating the seals of the basin cup and the insert; and
draining water in the overpack annulus space.

7. The method of claim 1, wherein the overpack has at least one layer that absorbs neutrons and at least one layer that absorbs gamma radiation.

8. The method of claim 1, wherein the overpack has at least one lifting trunion and wherein the steps of placing the overpack into the pool and removing the overpack from the pool are performed by using the at least one trunion.

9. The method of claim 1, wherein the method is performed in a facility having a small modular reactor (SMR).

10. The method of claim 1, wherein the basin cup comprises a flat bottom having a circular periphery and an upstanding cylindrical lateral wall.

11. The method of claim 1, further comprising the steps of, after removing the basin cup:
attaching a seismic stability ring at the bottom end of the overpack; and
placing the ventilated overpack with the seismic stability ring on a storage pad.

12. The method of claim 1, further comprising the step of, after removing the basin cup, placing the ventilated overpack on a recessed opening of a ventilated storage pad.

13. A method for enabling removal of hazardous radioactive spent nuclear fuel in a pool and then dry storage in canisters within ventilated overpacks, the method comprising the steps of:
providing a metal overpack having an elongated cylindrical body extending between a top end and a bottom end, the body defining an internal annulus space, the bottom end having at least one inlet vent for enabling airflow into the annulus space;
providing a metal canister having an elongated cylindrical body extending between a top end and a bottom end, the body defining an internal space designed to receive hazardous radioactive spent nuclear fuel;
placing the canister into the overpack annulus space;
attaching a basin cup at the bottom end of the overpack, the basin cup having an inflatable inner circular seal;
inflating the basin cup seal in order to seal the at least one inlet vent and the bottom of the overpack annulus space;
installing an insert ring between the top end of the overpack and the top end of the canister, the insert ring having inflatable inner and outer circular seals;
inflating the insert ring seals in order to seal the top end of the overpack annulus space;
introducing demineralized water into the overpack annulus space;
placing the overpack into a pool that is contaminated with the hazardous radioactive spent nuclear fuel;
loading the fuel into the canister;
attaching a closure lid over the canister in order to seal the fuel within the canister;
removing the overpack from the pool;
seal welding closure lid to the canister;
via ports in the lid, draining water from the canister, and filling the canister with an inert helium gas;
welding covers over the ports;
deflating the seals of the basin cup and the insert;
draining water in the overpack annulus space;
removing the insert ring;
installing a ventilated lid that has at least one outlet vent for enabling airflow out of the annulus space; and
removing the overpack from the basin cup in order to provide a ventilated overpack with the canister for dry storage.

14. The method of claim 13, wherein the overpack has at least one layer that absorbs neutrons and at least one layer that absorbs gamma radiation.

15. The method of claim 13, wherein the overpack has at least one lifting trunion and wherein the steps of placing the overpack into the pool and removing the overpack from the fool are performed by using the at least one trunion.

16. The method of claim 13, wherein the method is performed in a facility having a small modular reactor (SMR).

17. The method of claim 13, wherein the basin cup comprises a flat bottom having a circular periphery and an upstanding cylindrical lateral wall.

18. The method of claim 13, further comprising the steps of, after removing the basin cup:
attaching a seismic stability ring at the bottom end of the overpack; and
placing the ventilated overpack with the seismic stability ring on a storage pad.

19. The method of claim 13, further comprising the step of, after removing the basin cup, placing the ventilated overpack on a recessed opening of a ventilated storage pad.

20. A fuel loading apparatus situated in a pool that is contaminated with the hazardous radioactive spent nuclear fuel, the apparatus comprising:
a metal overpack having an elongated cylindrical body extending between a top end and a bottom end, the body defining an internal annulus space, the bottom end having at least one inlet vent for enabling airflow into the annulus space;
a metal canister having an elongated cylindrical body extending between a top end and a closed bottom end, the canister residing within the overpack annulus space, the canister body defining an internal space containing hazardous radioactive spent nuclear fuel;
a closure lid situated over the top end of the canister in order to seal the fuel within the canister;
a removable basin cup attached at the bottom end of the overpack, the basin cup sealing the at least one inlet vent and the bottom of the overpack annulus space; and
a removable insert ring situated between the overpack and the canister at the top end of each, the insert ring sealing the top end of the overpack annulus space.

21. The apparatus of claim 20, wherein the basin cup has an inflated inner circular seal that seals the at least one inlet vent and the bottom of the overpack annulus space.

22. The apparatus of claim 20, wherein the insert ring has inflated inner and outer circular seals that seal the top end of the overpack annulus space.

23. The apparatus of claim 20, further comprising demineralized water in the overpack annulus space.

24. The apparatus of claim 20, wherein the overpack has at least one layer that absorbs neutrons emitted from the fuel and at least one layer that absorbs gamma radiation emitted from the fuel.

25. The apparatus of claim 20, wherein the overpack has a plurality of lifting trunions that enable the overpack to be moved.

26. A facility having a small modular reactor (SMR) and having the apparatus of claim 20 in the pool.

27. The apparatus of claim 20, wherein the basin cup comprises a flat bottom having a circular periphery and an upstanding cylindrical lateral wall, the flat bottom resting on a bottom associated with the pool.

28. The apparatus of claim 20, wherein the insert ring comprising a plurality of outwardly extending tabs that enable the ring to be secured.

29. A method for moving the fuel to a ventilated dry storage cask, comprising the steps of:

removing the overpack of claim 20 from the pool;

seal welding the closure lid to the canister;

via ports in the closure lid, draining water from the canister and filling the canister with an inert helium gas;

welding covers over the ports;

deflating the seals of the basin cup and the insert;

draining water from the overpack annulus space;

removing the insert ring;

installing a ventilated lid that has at least one outlet vent for enabling airflow out of the annulus space; and removing the basin cup from the overpack to produce the ventilated dry storage overpack with the canister for dry storage.

* * * * *